United States Patent [19]
Kundermann

[11] Patent Number: 6,012,558
[45] Date of Patent: Jan. 11, 2000

[54] HYDRODYNAMIC COUPLING DEVICE WITH A LOCKUP CLUTCH

[75] Inventor: Wolfgang Kundermann, Schweinfurt, Germany

[73] Assignee: Mannesmann Sachs AG, Schweinfurt, Germany

[21] Appl. No.: 09/245,244

[22] Filed: Feb. 5, 1999

[30] Foreign Application Priority Data

Feb. 6, 1998 [DE] Germany .......................... 198 04 635

[51] Int. Cl.⁷ .................................................. F16D 33/00
[52] U.S. Cl. .......................... 192/3.29; 192/3.28; 192/3.3
[58] Field of Search ................................ 192/3.29, 3.28, 192/3.3, 57, 212

[56] References Cited

U.S. PATENT DOCUMENTS 5,004,082  4/1991  Sakakibara et al. .................... 192/3.26

FOREIGN PATENT DOCUMENTS 196 17 409  11/1996  Germany ......................... F16H 45/02
2256262  12/1992  United Kingdom .................. 192/3.28

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

A hydrodynamic coupling device includes a hydrodynamic circuit having at least an impeller wheel and a turbine wheel and a lockup clutch having an axially movable piston and a torsional vibration damper. The torsional vibration damper has a drive-side transmission element and a driven-side transmission element which is rotatable relative to the latter, each of which is provided with driving means for elastic elements of the torsional vibration damper. A first driving device is provided at a radial outer area of the turbine wheel. For an arrangement of the elastic elements substantially radially outside of the impeller wheel, the first driving device extends beyond this impeller wheel. The second driving device has at least one area radially outside of the elastic elements which receives a friction facing or which serves as a friction surface for the friction facing.

15 Claims, 2 Drawing Sheets

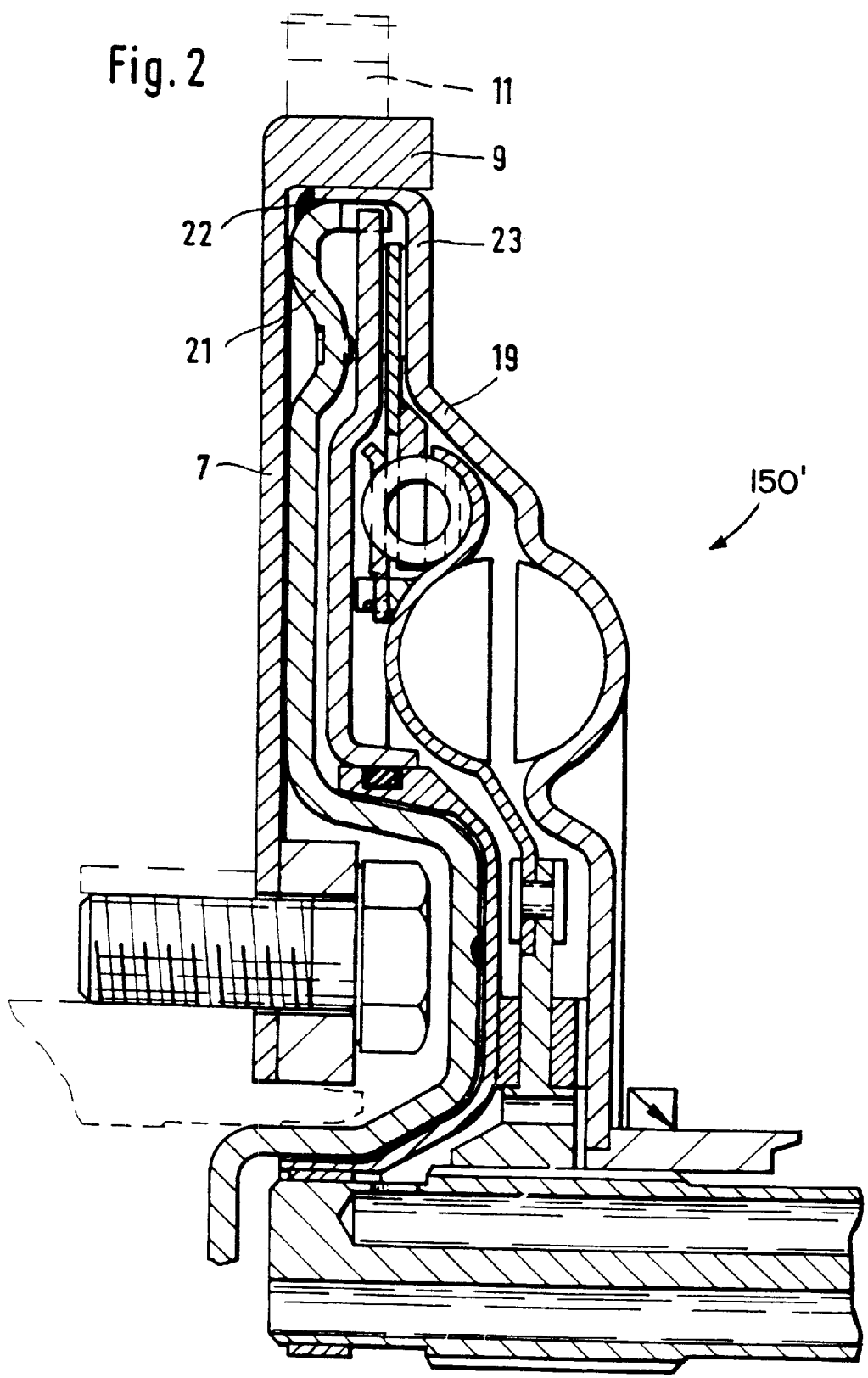

HYDRODYNAMIC COUPLING DEVICE WITH A LOCKUP CLUTCH

BACKGROUND OF THE INVENTION

1. Field of the Invention

The invention is directed to a hydrodynamic coupling device having an impeller wheel, a turbine wheel, and a lockup clutch with an axially movable piston and a torsional vibration damper.

2. Description of the Related Art

A prior art hydrodynamic coupling is disclosed in German reference DE 196 17 409 Al, particularly in FIG. 1. This reference describes the hydrodynamic coupling device in the form of a torque converter having, among others, an impeller wheel and a turbine wheel which, together with a stator wheel, form a hydrodynamic circuit. Further, there is provided a lockup clutch having an axially movable piston and a torsional vibration damper which has elastic elements in the form of springs extending in the circumferential direction. Bent portions are provided at the piston as well as at a ring fastened to the turbine shell for the purpose of driving these elastic elements, wherein the bent portions at the ring act as first driving means for the elastic elements and the bent portions at the piston act as second driving means. The torsional vibration damper is active when the lockup clutch is closed, i.e., when the piston contacts a friction surface of a primary flange of the clutch housing via a friction facing. Torsional vibrations present at the clutch housing are superimposed on the torque and are conducted via the piston to the elastic elements. From the elastic elements, the torsional vibrations are conducted to the turbine via the ring fastened to the turbine shell. In turn, the turbine, in a known matter, conducts torque and damped torsional vibrations via the turbine hub to a driven shaft which acts as a transmission input shaft. With respect to the flow of torque, the piston acts as a drive-side transmission element of the torsional vibration damper and the ring fastened to the turbine shell acts as a driven-side transmission element of the torsional vibration damper.

As can be seen from the hydrodynamic coupling device according to FIG. 1, this prior art hydrodynamic coupling device is extremely wide in the axial direction and is therefore not suitable for installation in compact automobiles where there is usually only limited installation space. In this regard, it is noted in particular that the hydrodynamic circuit is particularly wide as a result of the intermediate arrangement of a stator wheel between the impeller wheel and turbine wheel on the one hand and, on the other hand, as a result of the arrangement of the lockup clutch including the torsional vibration damper axially alongside the hydrodynamic circuit, much installation space is taken up in this direction.

SUMMARY OF THE INVENTION

It is the object of the invention to provide a hydrodynamic coupling device having a lockup clutch with a torsion vibration damper with minimal axial installation space.

This object is met according to the invention by a hydrodynamic coupling device, including an impeller wheel rotatably mounted about and axis of rotation and having an impeller shell and an impeller vane arrangement, a turbine wheel rotatably mounted about the axis of rotation and having a turbine shell and a turbine vane arrangement, the turbine wheel and the impeller wheel forming a hydrodynamic circuit, and a lockup clutch having an axially movably piston and a torsional vibration damper having a drive-side transmission element, a driven-side transmission element and a circumferentially acting elastic element. The drive-side transmission element comprises first drive side means and the driven-side transmission element comprises second drive side means and the elastic element is resiliently circumferentially held between the first and second drive side means. The second driving means is arranged proximate a radially outer end of the turbine wheel such that the elastic element is arranged substantially radially outside of the impeller vane arrangement. In addition, The lockup clutch has one of a friction facing and a friction surface mounted on an area of the first driving means located radially outside of said elastic element.

It will be briefly noted first that a hydrodynamic coupling device may be a torque converter as well as a hydro-coupling. It is known that the hydro-coupling differs from the torque converter in that the torque converter includes a stator wheel and the hyro-coupling does not. Therefore the positive characteristic of torque multiplication possessed by the torque converter are dispensed with in the hydrocoupling. This fundamental disadvantage of a hydro-coupling is offset by its advantage of compact axial construction, so that the hydro-coupling can be advantageous compared to the torque converter for the present application which is particularly concerned with a compact axial construction, The unfavorable efficiency of a hydro-coupling compared with a torque converter can be rendered insignificant in that the hydro-coupling is used only at particularly critical operating phases of the vehicle in question, such as starting up or switching, while the lockup clutch remains closed in all other operating states. Therefore, in the vast majority of different operating states the hydrodynamic coupling device is operated as a friction clutch, for which reason considerable value is set on a high torque transmission capability of the lockup clutch and on excellent damping characteristics of the torsional vibration damper. According to the invention, these functional demands should be accompanied by a compact construction of the entire hydrodynamic coupling device.

In accordance with the invention, the solution to this problem lies in the radially nested construction of the hydrodynamic circuit, torsional vibration damper and friction area of the lockup clutch. To that end, the first driving means for the elastic elements of the torsional vibration damper are arranged substantially radially outside of the turbine wheel and therefore radially outside of the hydrodynamic circuit, while the second driving means of this torsional vibration damper have, again at the radial outside of the elastic elements, at least one area which serves to receive a friction facing or which serves as a friction surface for a friction facing. Accordingly, the hydrodynamic circuit is arranged in a radially innermost location which has certain disadvantages with respect to its efficiency. However, because this hydrodynamic circuit is only active during brief periods of the special operating states mentioned above such as starting up or switching, the unfavorable efficiency has only a negligible effect with respect to the total distance traveled by a motor vehicle.

In contrast, the friction facings and friction surfaces for the latter, which are continuously active except in the above-mentioned operating states, are arranged over the radially greatest extension, so that high torques can also be transmitted easily through the lockup clutch. The elastic elements of the torsional vibration damper are also placed as far as possible to the radial outside, so that a comparatively large spring path is available in the circumferential direction for effectively damping torsional vibrations of large magnitude which are introduced via the clutch housing, especially at relatively low rates of rotation of tie drive.

According to the claims, the turbine shell at the turbine wheel of the hydrodynamic circuit projects beyond the vane arrangement of the turbine wheel and can accordingly be utilized as the first driving means for the elastic elements of the torsional vibration damper. This further improves the ability to nest the individual elements one inside the other while economizing on structural component parts because the radial distance as well as the axial distance between the elastic elements relative to the turbine wheel can be minimized in this way. The arrangement of a rim at the turbine shell serves the same purpose, wherein the rim engages via an axial toothing with a cover plate considered as the second part of the turbine-side driving means for the elastic elements so as to be fixed with respect to rotation relative to it. The axial securing of this cover plate on the rim is effected by a securing ring, wherein the axial toothing of the rim engages behind the securing ring.

The second driving means also serve to economize on structural component parts and to optimize installation space in view of the fixed connection with a blade which either receives the friction facings or has the friction surfaces for the friction facings. In this configuration, the friction area of the lockup clutch can be arranged at the smallest possible distance from the torsional vibration damper.

A further reduction in installation space compared with the conventional solutions of the prior art is provided in that the piston of the lockup clutch acts on the blade in a direction toward the impeller shell in a frictional engagement. The friction correction between the clutch housing and the lockup clutch is accordingly located on the transmission side.

A further step which favors the axially compact construction is that the piston of the lockup clutch is secured against rotational movements relative to the clutch housing via a toothing which is provided at the outer circumference of the piston. The clutch housing in this particular embodiment has a counter-toothing at the radial outer end of a primary flange facing the drive, for example, an internal combustion engine. The axially compact construction is further facilitated in that the impeller shell axially overlaps this counter-toothing of the primary flange to the extent that the impeller shell ends beyond the tooth base of the counter-toothing at the primary flange. The desired tightness is ensured in every case in that the primary flange and the impeller shell are welded with one another.

The a hydrodynamic coupling device is usually connected to a drive by an axially flexible plate. To economize on axial installation space, the flexible plate is constructed in the present case radially outside of the clutch housing with an axial shoulder which has an inner toothing for transmitting torque. The inner toothing engages with an outer toothing provided at the circumference of the clutch housing. However, it is also possible to introduce the clutch housing into this axial shoulder with radial pretensioning, such that the clutch housing is radially pressed into the flexible plate. Regardless of the type of connection selected between the flexible plate and the clutch housing, the axial shoulder of the flexible plate can receive a toothed rim which can be brought into a working connection with a starter pinion in a manner known.

According to the claims, the fastening of the flexible plate, and therefore of the hydrodynamic coupling device, to the drive is carried out via fastening means radially inside of the hydrodynamic circuit. The fastening means engage axially in an axial bulge in the primary flange of the hydrodynamic coupling device. Since none of the structural component parts that are absolutely required for transmitting torque—namely, the hydrodynamic circuit, torsional vibration damper and blade—is present in the radial area of extension of this bulge, axial installation space is economized once again.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 is a section view corresponding to FIG. 1 showing another embodiment of a hydrodynamic coupling device according to the invention with a radial pressing connection between the flexible plate and the clutch housing.

DETAILED DESCRIPTION OF THE PRESENTLY PREFERRED EMBODIMENTS

Figure 1:
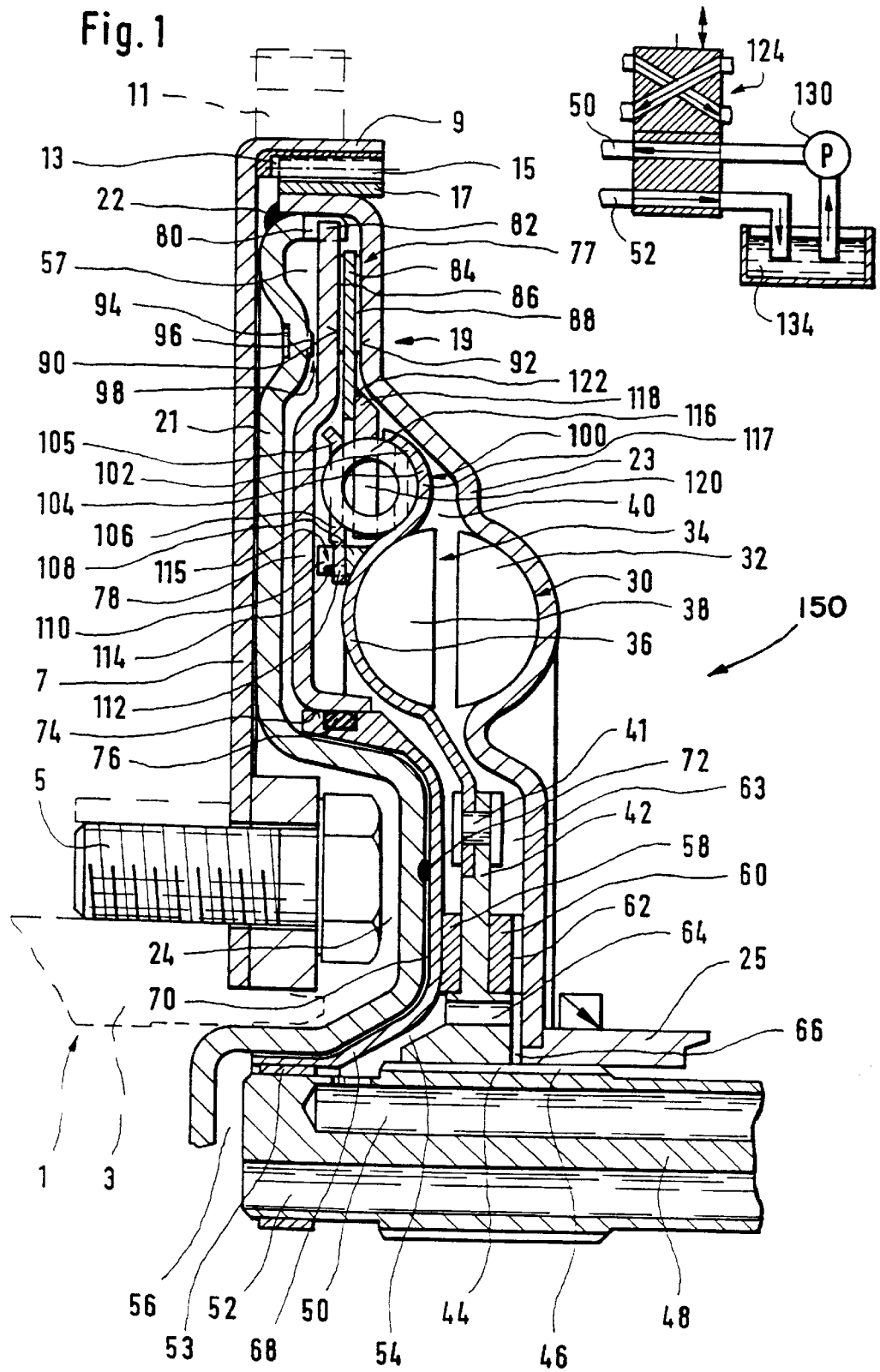
FIG. 1 is a sectional view showing an upper half of an embodiment of a hydrodynamic coupling device according to the invention with a toothing between a flexible plate on the drive side and a clutch housing.

FIG. 1 shows an embodiment of a hydrodynamic coupling device 150 according to an embodiment of the present invention. A drive 1 such, for example, as an internal combustion engine with a crankshaft 3 is shown schematically by dashed lines. Fastening elements 5 in the form of screws or bolts which threadably engage corresponding threaded bore holes of the crank-shaft 3 connect an axially flexible plate 7 to the crankshaft 3. The axially flexible plate 7 extends radially outward. A circumferential area of the flexible plate 7 has an axial shoulder 9 which extends away from the drive 1. This axial shoulder 9 carries a toothed rim 11 and has an inner toothing 13 which engages with an outer toothing 15 of a toothed ring 17 that is connected to a clutch housing 19.

The clutch housing 19 has an essentially radially extending primary flange 21 with an axially curved out portion 24 which curves around the area of extension of the fastening means 5. An outer circumferential area of the primary flange 21 is fixedly connected to an impeller shell 23 by a weld 22. A radially inner area of the impeller shell 23 is connected with a clutch hub 25. A vane arrangement 32 is arranged in a radially central region of the impeller shell 23 forming an impeller wheel 30 which cooperates with a turbine wheel 34 containing a turbine shell 36 and a vane arrangement 38. The impeller wheel 30 and the turbine wheel 34 form a hydrodynamic circuit 40.

The turbine shell 36 is lengthened radially inward and is fastened to a turbine hub 42 via a rivet connection 41. The radially inner side of the turbine hub 42 has a turbine toothing 44 which engages in a shaft toothing 46 of a driven shaft 48. This driven shaft 48 is usually the transmission input shaft. This driven shaft 48 is provided with axially extending channels 50, 52 which communicate with a hydro-pump 130 that is switchable by a valve 124. The hydro-pump 130 functions in that either channel 50 or channel 52 is provided with overpressure by receiving fresh hydraulic fluid via the hydro-pump 130 from a reservoir or supply 134. The driven shaft 48 is mounted via a radial bearing 53 in a housing hub 68 which is fastened in turn by a weld 72 to the primary flange 21. The housing hub 68 and the primary flange 21 define a passage 70 which opens into a space 56 at the radially inner end of the primary flange and a chamber 57 at the radially outer end of the primary flange. The space 56 is directly connected with the channel 52.

In contrast, the channel 50 in the driven shaft 48 is connected, with respect to flow, with a space 54 provided at the side of the housing hub 68 remote of the passage 70. This space 54 on a drive side of the turbine hub 42 communicates with an access 66 on the driven side of the turbine hub via an axial passage 64 through the turbine hub 42. The access 66 extends radially outward via a groove 62 into an axial bearing 60 which axially supports the driven side of the turbine hub 42 relative to the impeller shell 23. The drive side of the turbine hub 42 is supported by an axial bearing 58 at the housing hub 68. The groove 62 in the axial bearing 60 is connected with the hydrodynamic circuit 40 via a space 63.

An outer circumference of the housing hub 68 has a support 74 for a piston 78 of a lockup clutch 77. The piston 78 is axially guided along a seal 76 at the support 74 so that the piston 78 is axially displaceable and rotatably mounted on the support 74. A toothing 82 at an outer circumference of the piston 78 connected with an axial toothing 80 of the primary flange 21 ensures that the piston 78 is secured against rotation relative to the primary flange. The primary flange further comprises an indentation 94 proceeding from the side of the flexible plate 7 toward the piston 78. The side of the indentation 94 facing the piston 78 includes a pressed out portion 96 which forms an axial stop 98 for the piston 78.

An axially displaceable blade is arranged between the piston and the impeller shell 23 radially outside of the impeller vane arrangement 32. The piston 78 can be brought into a working connection with a friction surface 92 of the impeller shell 23 via a friction facing 86 which is fastened at one side of the blade 84 and via a second friction facing 88 which is fastened at the opposite side of the blade 84. For this purpose, the piston 78 has a friction surface 90 in the area of extension of the fiction facing 86. The blade 84 is lengthened radially inward over the friction facings 86, 88 and is connected with a hub disk 120 by a weld 122. The hub disk 120 contacts a circumferential end of the elastic elements 116. These elastic elements 116 are circumferentially oriented helical springs. The opposite circumferential side of the elastic elements 116 are supported by a radial outward lengthening 117 of the turbine shell 36 and a cover plate 105 which are formed as described in the following paragraph.

The radial outward lengthening 117 of the turbine shell curves around an axial side of the elastic elements 116. The other axial side of the elastic elements 116 is acted upon by the cover plate 105. A toothing 112 at the radially inner end of the cover plate engages an axial toothing 110 of a rim 108 fastened to the turbine shell 36 such that the toothing 112 is fixed with respect to rotation relative to the axial toothing 110. A securing ring 114 is provided at the rim 108 to axially secure the cover plate 105. The securing ring 114 penetrates into a corresponding radial depression 115 of the axial toothing 110 of the rim 108 at the side of the cover plate 105 remote of the turbine shell 36. The lengthening 117 of the turbine shell 36 comprises a first part 104 of a first driving means 102 of a torsional vibration damper 100. The cover plate 105 forms a second part 106 of the first driving means 102. The hub disk 120 described above forms a second driving means 18 of the torsional vibration damper 100.

The operation of the hydrodynamic coupling device 150 will now be described. For determined brief operating states such, for example, as starting up or switching, only the hydrodynamic circuit 40 is active. During these states of operation, the valve 124 of the hydro-pump 130 is adjusted such that the channel 50 of the driven shaft 48 is supplied with hydraulic fluid and accordingly with an overpressure. This overpressure propagates via the channel 50 and the space 54 through the axial passage 64 into the turbine hub 42 so as to penetrate, via the groove 62 of the axial bearing 60, into the space 63, from which it passes into the hydrodynamic circuit 40. The flow between the impeller wheel 30 and the turbine wheel 34 drives the turbine hub 42 which transmits its movement via the toothing 44, 46 to the driven shaft 48. At the same time, an overpressure is formed in the space radially outside of the impeller wheel 30 and turbine wheel 34 and causes the piston 78 to lift from the friction facing 86 and therefore leads to a release of the blade 84. The piston 78 is shifted toward the primary flange 21 until it abuts the axial stop 98. In this switching of the hydrodynamic coupling device 150, the transmission of torque is carried out exclusively via the hydrodynamic circuit 40.

At the conclusion of the above described operating state, the valve 124 of the hydro-pump 130 is switched so that the channel 50 of the driven shaft 48 is without pressure and, instead, the channel 52 is supplied with hydraulic fluid accompanied by the overpressure. This overpressure propagates via the space 56 and the passage 70 radially outward and is accordingly present in the space 57 axially between the piston 78 and the primary flange 21. As a result, the piston 78 is displaced axially away from the primary flange until both friction facings 86, 88 are in a frictional engagement with the respective associated friction surfaces 90, 92 due to the influence of the piston 78 on the friction facing 86. In his operating state, torque which is present at the clutch housing 19 is transmitted via the friction facings 86, 88 to the blade 84. At the same time, torque is conducted via the toothing 80, 82 between the primary flange 21 and the piston 78 to the latter. This torque is conducted via the torsional vibration damper 100 to the turbine hub 42 and then to the driven shaft 48 as was already described above.

The invention has been described with reference to a hydrodynamic coupling device which has a hydro-coupling to minimize the axial space requirement. Of course, the overall construction may also be realized in a torque converter when a stator wheel is provided between the impeller wheel 30 and the turbine wheel 34 as is shown, for example, in DE 196 17 409 Al which was mentioned in the introduction. As a result of this step, conversion of torque is achieved only when torque is transmitted via the hydrodynamic circuit. The rest of the characteristics of this hydrodynamic coupling device which were described above are not affected by the addition of a stator wheel.

FIG. 2 shows a hydrodynamic coupling device 150 which differs from the device shown in FIG. 1 only in that the clutch housing 19 is radially pressed onto the axial shoulder 9 of the flexible plate 7 by the impeller shell 23 instead of being connected via a toothing. This radial pressing secures the clutch housing 19 not only in the rotating direction but also the axial direction relative to the flexible plate 7.

The invention is not limited by the embodiments described above which are presented as examples only but can be modified in various ways within the scope of protection defined by the appended patent claims.

I claim:

1. A hydrodynamic coupling device, comprising:
an impeller wheel rotatably mounted about and axis of rotation and having an impeller shell and an impeller vane arrangement;
a turbine wheel rotatably mounted about said axis of rotation and having a turbine shell and a turbine vane arrangement, said turbine wheel and said impeller wheel forming a hydrodynamic circuit;
a lockup clutch including an axially movably piston and a torsional vibration damper having a drive-side transmission element, a driven-side transmission element and a circumferentially acting elastic element, said drive-side transmission element comprising first driving means and said driven-side transmission element comprising second driving means and said elastic element being resiliently circumferentially held between said first and second driving mean;
said second driving means being arranged proximate a radially outer end of said turbine wheel such that said elastic element is arranged substantially radially outside of said impeller vane arrangement; and
said lockup clutch having one of a friction facing and a friction surface mounted on an area of said first driving means located radially outside of said elastic element.

2. The hydrodynamic coupling device of claim 1, wherein said turbine shell comprises a radial lengthening extending radially outside of said turbine vane arrangement and forming a first part of said second driving means.

3. The hydrodynamic coupling device of claim 2, further comprising a rim portion mounted on said turbine shell having an axial toothing; and
a second part of the second driving means comprising a cover plate having a counter-toothing and engaging said rim portion such that said cover plate is non-rotatably disposed relative to said rim portion.

4. The hydrodynamic coupling device of claim 3, further comprising a securing ring mounted on said rim for axially securing said cover plate relative to said rim portion, said axial toothing of said rim portion engaging said securing ring.

5. The hydrodynamic coupling device of claim 1, further comprising an axially displaceable blade having two opposing axial sides and comprising one of a friction surface and a friction facing arranged on said two opposing axial sides, said blade being arranged axially between said piston and said impeller shell, wherein said first driving means is connected with said axially displaceable blade such that said first driving means is fixed with respect to rotation relative to said axially displaceable blade.

6. The hydrodynamic coupling device of claim 1, further comprising a clutch housing having a primary flange facing a drive, said primary flange having a housing hub proximate a radially inner portion of said primary flange;
said piston being rotatably mounted on a housing hub having a toothing in a radially outer area engaging a counter toothing on said primary flange so that said piston is rotatably fixed relative to said primary flange.

7. The hydrodynamic coupling device of claim 6, wherein said counter-toothing of said primary flange extends substantially perpendicular to said piston and is radially enclosed in a seal-tight manner by said radially outer portion of said impeller shell.

8. The hydrodynamic coupling device of claim 7, wherein said impeller shell is connected with said primary flange beyond said counter-toothing by a weld.

9. The hydrodynamic coupling device of claim 1, further comprising a clutch housing having a primary flange facing a drive, said primary flange having an indentation with a pressed out portion facing said piston, said pressed out portion comprising an axial stop for said piston.

10. The hydrodynamic coupling device of claim 7, further comprising an axially flexible plate having an axial shoulder proximate a radially outer end of said flexible plate for fastening said clutch housing to the drive, wherein said impeller shell comprises an axial outer toothing engaging an axially inner toothing formed at said axial shoulder of said flexible plate.

11. The hydrodynamic coupling device of claim 7, further comprising an axially flexible plate having an axial shoulder proximate a radially outer end of said flexible plate for fastening said clutch housing to the drive, said axial shoulder of said flexible plate enclosing said impeller shell such that said axial shoulder radially presses a radially outer end of said impeller shell.

12. The hydrodynamic coupling device of claim 10, wherein said axial shoulder comprises means for receiving a toothed rim on its radially outer side.

13. The hydrodynamic coupling device of claim 11, wherein said axial shoulder comprises means for receiving a toothed rim on its radially outer side.

14. The hydrodynamic coupling device of claim 1, further comprising a clutch housing having a primary flange facing a drive and fastening means arranged radially inside of said turbine wheel for connecting said clutch housing to the drive.

15. The hydrodynamic coupling device of claim 1, further comprising a clutch housing having a primary radial flange having a radially outer end connected to said impeller wheel, wherein said primary flange comprises an axial curved out portion extending toward said turbine hub radially inside of said hydrodynamic circuit, said axial curved out portion receiving fastening elements for connecting said clutch housing to a drive.

* * * * *